Nov. 22, 1955 — L. T. MILLER — 2,724,206

FISH LINE FLOAT

Filed Oct. 31, 1952

INVENTOR.
LONNIE T. MILLER
BY
ATTORNEYS

United States Patent Office 2,724,206
Patented Nov. 22, 1955

2,724,206
FISH LINE FLOAT
Lonnie T. Miller, Flagler Beach, Fla.

Application October 31, 1952, Serial No. 318,020

1 Claim. (Cl. 43—43.1)

This invention relates to fish line floats and more particularly to a float adapted to produce a fish attracting sound in the water as well as to support an associated fish line.

It is among the objects of the invention to provide an improved fish line float of elongated shape having line receiving bores opening to the opposite ends thereof, so that the float will tend to stand upright in the water when supporting a line equipped with the usual hook and sinker; which can be easily pulled beneath the water when subjected to the pull of a fish on the associated line; which has a conically recessed upper end to produce a splashing sound when the line extending from the upper end of the float is jerked by a fisherman using the float, such splashing sound simulating the feeding sound of fish and attracting fish to the vicinity; which is longitudinally flared outwardly to its upper end to enhance its sound producing ability; and which is simple and durable in construction, economical to manufacture, and neat and attractive in appearance.

Other objects and advantages will become apparent from a consideration of the following description and the appended claim in conjunction with the accompanying drawing wherein:

Figure 1:
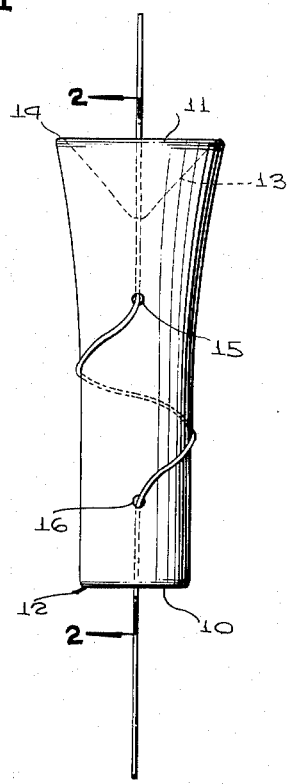
Figure 1 is a side elevational view of a fishing line float illustrative of the invention.
Figure 2:
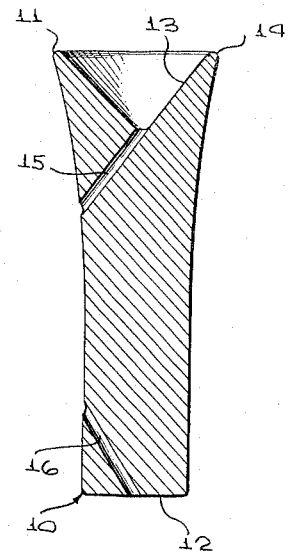
Figure 2 is a longitudinal, medial cross sectional view of the float on the line 2—2 of Figure 1.

With continued reference to the drawing, the float comprises an elongated body, generally indicated at 10, formed of a buoyant material, such as wood, and preferably having a circular cross sectional shape. The ends of the float are disposed substantially in spaced apart planes perpendicular to the longitudinal center line of the body 10 and the major portion of the body is substantially cylindrical in shape, being flared outwardly or somewhat bell-shaped from a position intermediate its length to one end thereof, so that its normally upper end 11 is larger than its normally lower end 12.

The larger, upper end 11 is provided with a recess or concavity 13 of conical shape and V-shaped in cross section which has its apex substantially on the longitudinal center line of the float body and occupies the major portion of the area of the larger end 11 of the body leaving only a narrow, rounded bead 14 of circular or annular shape extending around the larger end of the float body. The conical recess 13 has a depth substantially equal to the radius of the larger end 11 of the float body 10, and a line receiving bore 15 extends angularly from the apex of the recess 13 to the side surface of the body at a location intermediate the length of the body and between the apex of the recess 13 and the mid-length location of the body.

A second line receiving bore 16 extends angularly from the center of the smaller end 12 of the float body to the side surface of the body at a location spaced from the adjacent end of the bore 15, so that a line connected to the body will extend from the centers of the ends of the body and tend to maintain the body in upright position in the water with the larger end 11 of the body above the water. The size and buoyancy of the body is such that the float is easily pulled under the water by the pull of a fish on a hook attached to the portion of the line depending from the lower end of the float.

In attaching the float to the line, an end of the line is first threaded through the bore 15 from the apex of the conical recess 13 and the line is then pulled outwardly of the end of the bore 15 opening to the side surface of the float and wrapped once around the float between the adjacent ends of the bores 15 and 16, as illustrated in Figure 1. The line is then threaded through the bore 16 from the end of this bore opening on the side surface of the float and is pulled through the bores 15 and 16 until it depends to the desired extent from the smaller end of the float. The usual hook and sinker, not illustrated, is connected to the portion of the line extending from the smaller end of the float at the end of this portion of the line remote from the float.

Figure 3:
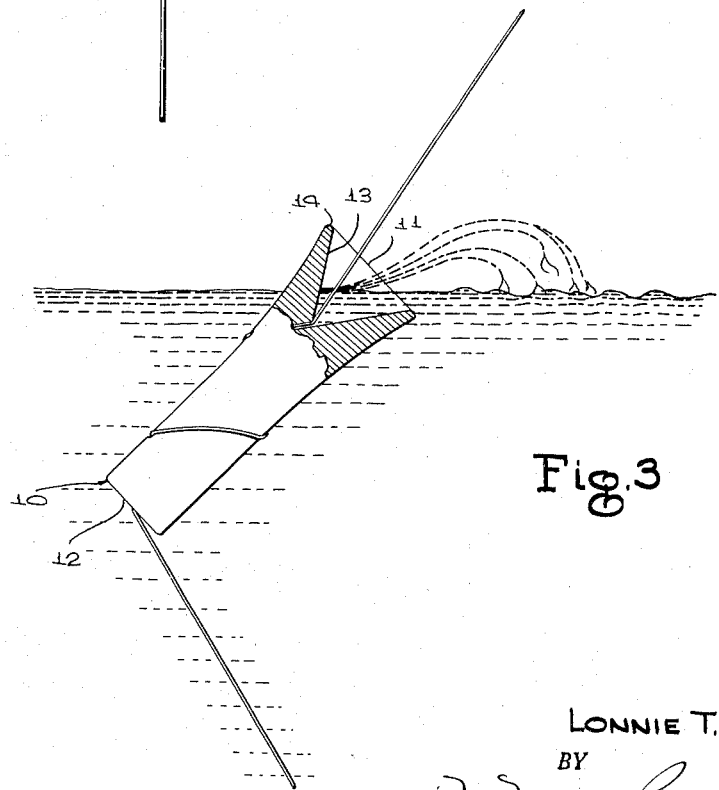
Figure 3 is a view showing the sound producing position of the float in the water, a portion of the float being broken away and shown in cross section to better illustrate the construction thereof.

When the float is supported in upright position in the water with its larger, recessed end above the water, by jerking on the fishing rod or pole connected to the portion of the line extending from the larger, upper end of the float, the fisherman can cause the float to tilt, as illustrated in Figure 3, to dip water into the recess 13 and to discharge this water onto the surface of the water adjacent the float to cause a splashing sound simulating the sound of fish feeding at the surface of the water. This sound attracts fish to the vicinity of the float and also, apparently, provides them with a desire to feed, since it has been demonstrated that a satisfactory catch can be obtained with this float at times when no fish were caught by floats incapable of producing the splashing sound.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A fishing line float comprising an elongated body of buoyant material having line-receiving bores extending angularly therein with relation to the axis of said body from its opposite ends to spaced apart locations intermediate the length thereof which form the sole line attaching means for said body, said body being flared outwardly from a location intermediate its length to one end thereof so that said one end is larger than the other end thereof and having in its larger end a conical recess V-shaped in cross section occupying the major portion of the area of said one end with its apex on the longitudinal center line of said body and said body being circular in cross section and cylindrical in shape from said other end to said location intermediate its length from which it flares outwardly to said one end.

References Cited in the file of this patent

UNITED STATES PATENTS

| 484,254 | Settle | Oct. 11, 1892 |
| 1,153,473 | Wilson | Sept. 14, 1915 |
| 2,103,222 | Nelson | Dec. 21, 1937 |